(12) United States Patent
Okmyanskiy et al.

(10) Patent No.: US 9,389,993 B1
(45) Date of Patent: Jul. 12, 2016

(54) SYSTEM AND METHOD FOR WHITELIST MANAGEMENT

(75) Inventors: Anton Okmyanskiy, Vancouver (CA); Mickael Graham, Bellevue Hill (AU); Eric Hamel, Paris (FR); Anal Srivastava, Maharashtra (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 162 days.

(21) Appl. No.: 13/188,196

(22) Filed: Jul. 21, 2011

Related U.S. Application Data

(60) Provisional application No. 61/379,993, filed on Sep. 3, 2010.

(51) Int. Cl.
*H04L 29/06* (2006.01)
*G06F 12/00* (2006.01)
*G06F 17/30* (2006.01)

(52) U.S. Cl.
CPC ............... *G06F 12/00* (2013.01); *G06F 17/30* (2013.01); *H04L 63/00* (2013.01)

(58) Field of Classification Search
None
See application file for complete search history.

(56) References Cited

U.S. PATENT DOCUMENTS

| | | | |
|---|---|---|---|
| 8,626,155 B2 * | 1/2014 | Rune ..................... | H04L 63/101 370/328 |
| 2002/0015403 A1 * | 2/2002 | McConnell et al. .......... | 370/352 |
| 2009/0093232 A1 | 4/2009 | Gupta et al. | |
| 2009/0094351 A1 | 4/2009 | Gupta et al. | |
| 2009/0094680 A1 | 4/2009 | Gupta et al. | |
| 2010/0075692 A1 | 3/2010 | Busschbach et al. | |
| 2010/0265827 A1 | 10/2010 | Horn et al. | |
| 2011/0116480 A1 | 5/2011 | Li et al. | |
| 2011/0177814 A1 | 7/2011 | Buchmayer et al. | |
| 2012/0142353 A1 * | 6/2012 | Jha et al. ....................... | 455/436 |

* cited by examiner

*Primary Examiner* — Joseph P Hirl
*Assistant Examiner* — Leynna Truvan
(74) *Attorney, Agent, or Firm* — Patent Capital Group

(57) ABSTRACT

A method is provided in one embodiment and includes receiving a request for a session at a network element; communicating a query for whitelist data to a provisioning element; receiving the whitelist data at the network element; and communicating a message to an access point that communicated the request, where the message is indicative of whether the session is to be accepted or denied based on the whitelist data. In more specific implementations, the network element is a gateway configured to receive the whitelist data via a RADIUS access accept message. In addition, source Internet protocol (IP) address verification associated with the session can be executed before a wireless device associated with the access point is permitted access to a network.

20 Claims, 6 Drawing Sheets

SYSTEM AND METHOD FOR WHITELIST MANAGEMENT

CROSS-REFERENCE TO RELATED APPLICATION

This application claims the benefit of priority under 35 U.S.C. §119(e) of U.S. Provisional Application Ser. No. 61/379,993, entitled "Femto Whitelist Management, Authentication and Authorization on HNB-GW" filed Sep. 4, 2010, which is hereby incorporated by reference in its entirety.

TECHNICAL FIELD

This disclosure relates in general to the field of communications and, more particularly, to whitelist management.

BACKGROUND

Networking architectures have grown increasingly complex in communication environments. For example, femtocells have gained recent notoriety due to their capabilities, and because of their ease-of-use. In general terms, access points can operate in licensed spectrum to connect wireless devices to the network (e.g., using broadband connections). For a mobile operator, the access points can offer improvements to both coverage and capacity: particularly applicable to indoor environments. Access points can also offer an alternative way to deliver the benefits of fixed-mobile convergence. For many access point scenarios, limiting public access poses a number of problems for end users and network operators alike.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EXAMPLE EMBODIMENTS

Overview

A method is provided in one embodiment and includes receiving a request for a session at a network element. The particular session can be sent by a wireless device and, further, can involve any number of possible flows such as a simple network access session, a session involving network services, a session involving an application, a session involving voice (e.g., a phone call using a wireless device), a session involving video (e.g., streaming content), or any other suitable network flow. The method can further include communicating a query for whitelist data to a provisioning element; receiving the whitelist data at the network element; and communicating a message to an access point that communicated the request, where the message is indicative of whether the session is to be accepted or denied based on the whitelist data. In more specific implementations, the network element is a gateway configured to receive the whitelist data via a RADIUS access accept message. In addition, source Internet protocol (IP) address verification associated with the session can be executed before a wireless device associated with the access point is permitted access to a network.

In specific embodiments, the whitelist data can include a pointer to a whitelist server, and the network element is configured to request a whitelist file from the whitelist server. In yet other implementations, the whitelist data can be cached by the network element for a time interval, which is received in a response to the query. The time interval is configurable, or default time intervals can be used. The whitelist data can include an International Mobile Subscriber Identity (IMSI), a Mobile Subscriber Integrated Services Digital Network (MSISDN) number, or any other relevant element or object. In addition, parameters within a register data of the access point can be used in order to validate a source IP address, and authenticate the access point such that it is authorized for subsequent flows with the network element. For example, a simple lookup of an IP address from a server (e.g., an address assignment server) can be performed for validating the identity of an access point. Many of these features discussed above are further detailed below with reference to specific access architectures.

Example Embodiments

Figure 1:
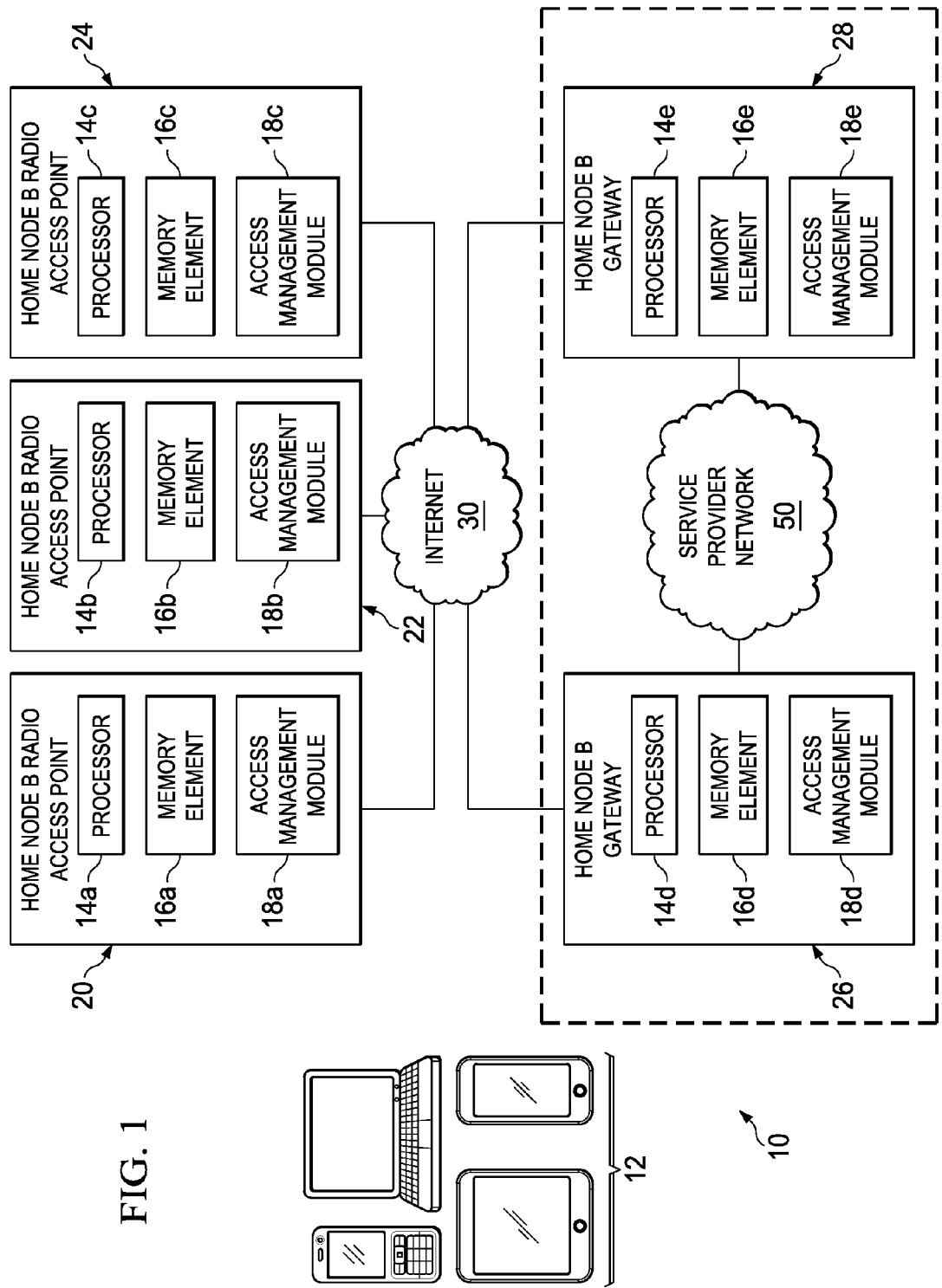
FIG. 1 is a simplified block diagram of a communication system for performing whitelist provisioning activities in accordance with one embodiment of the present disclosure.

Turning to FIG. 1, FIG. 1 is a simplified block diagram of a communication system 10 for performing whitelist activities in a network environment. FIG. 1 includes wireless devices 12, Home Node B (HNB) radio access points 20, 22, 24, Home Node B gateways (HNB-GWs) 26, 28, an internet 30, and a service provider network 50. [Home Node B radio access points are abbreviated HNBs herein for purposes of brevity.] HNBs 20, 22, 24 and HNB-GWS 26, 28 may each include a respective processor 14a-e, a respective memory element 16a-e, and a respective access management module 18a-e. HNBs 20, 22, 24 are connected to HNB-GWs 26, 28 via internet 30. Similarly, each HNB-GW 26, 28 can be connected to service provider network 50 in this example implementation.

Note that before detailing some of the operational aspects of FIG. 1, it is important to understand common characteristics of radio access points, femtocells, etc. as they generally operate in commercial architectures. The following foundational information is offered earnestly for purposes of teaching and example only and, therefore, should not be construed in any way to limit the broad teachings of the present disclosure. In many architectures, femtocells can be deployed as autonomous units to improve reception in areas with poor coverage, or within buildings where coverage is reduced by the structure itself. Wireless devices that are attached to (and in communication with) femtocells can have their data transmissions routed to the service provider's network (e.g., over the internet, over any suitable network, etc.). Thus, the access point (e.g., the femtocell) operates as a mini tower for the proximate user. However, the coverage provided by the access point is generally open to anyone within range: unless configurations operate to limit access to the network to only those individuals duly authorized for access.

Essentially, femtocells are fully featured (but low-power) wireless device base stations. Femtocells can be connected using standard broadband digital subscriber line (DSL) or cable service into the service provider's network. Femtocells offer excellent wireless device coverage at home for voice, data, etc., but at a lower cost than an arbitrary outdoor service. In operation, when in range of the femtocell (e.g., in a residential environment), a wireless device can automatically detect the femtocell, and subsequently use it (as a preference over outdoor cell sites). Calls can be made and received, where the signals are sent (potentially encrypted) from the femtocell via the broadband IP network to one of the mobile operator's main switching centers. Typically, femtocells operate at low radio power levels (e.g., less than cordless phones, WiFi, or many other household equipment). This can substantially increase battery life for wireless devices: both on standby and talk time. Additionally, because wireless devices are much closer to the femtocell, call quality is excellent and data devices can operate at full speed. Larger femtocell designs intended for business use (i.e., enterprise) can readily handle 8, 16, 32, etc. concurrent calls.

Femtocell users do not want open access to their femtocells. The main concern is paying extra for broadband internet usage, which might arise from unknown visitors who make extensive use of someone else's equipment. Other issues include reduced performance of broadband because the backhaul is being shared with unwelcomed visitors, where this unlawful access may further affect the performance of other computers, laptops, and other connected devices. Additionally, security concerns are prevalent in many of these architectures such that some type of spoofing and/or validation should systematically occur.

Separately, it should be noted that networks can leverage International Mobile Subscriber Identity (IMSI) data, which can uniquely identity a user (e.g., the SIM card). This means that an architecture should translate any phone number entered into an IMSI, which can be used by the femtocell to grant/deny access for the network. The Home Location Register (HLR) can maintain the database that maps these number systems together. It should also be noted that people constantly change their phones, their networks, their phone numbers, etc. These individuals also lose their phones, which can be replaced with a new SIM card that may (or may not) retain the same number. These changes should be propagated to the femtocell whitelist to ensure continued access for those users authorized for network access.

In accordance with the teachings of the present disclosure, communication system 10 is configured to not only offer an enhanced whitelist exchange mechanism, but also to effectively extend authentication and authorization (e.g., using an Authentication, Authorization and Accounting (AAA) server) to the HNB-GW. Operators can provision whitelists at various locations in the network. The architecture of the present disclosure offers a querying paradigm for a whitelist, where this querying occurs during registration (e.g., in the context of an access request). In general terms, if a given wireless device were to seek to initiate a session flow with a given HNB, the HNB would coordinate with the HNB-GW in order to determine (e.g., using whitelist data) whether the wireless device was permitted to consume resources at this particular HNB-GW.

Note that there are two different registrations that typically occur in the network. The first registration is associated with the HNB registering with its associated HNB-GW. The second registration is associated with the wireless device that seeks to camp on to the HNB. This second registration involves querying the HNB-GW before allowing the wireless device to consume bandwidth. During the second registration, the HNB-GW would evaluate its whitelist (which may have been suitably cached) and determine whether this particular wireless device (e.g., this particular IMSI) is authorized (and, more specifically, authorized at this particular access point). Further, the HNB-GW is intelligent enough to convert mobile protocols into an appropriate formatting that can be understood by the core network of the service provider.

Note that part of the solution being offered by communication system 10 allows for a centralization of the whitelist, which engenders more accurate whitelist data being suitably maintained. For example, in an enterprise solution, it would be onerous to continuously populate access points with the latest version of a whitelist (e.g., a listing of the company employees, who would be authorized for particular access points). Hence, there is a certain technical limitation in trying to push whitelist data to each individual access point of a network. Instead, the architecture of communication system 10 obviates this dilemma by centralizing the whitelist, which can (for example) be passed through request activities. The actual whitelist can be deployed anywhere in the network such that it can be readily accessed by HNB-GWs 26, 28. Hence, a whitelist can be suitably maintained for each femtocell, which can be updated to add/remove/change user data (e.g., IMSIs, phone numbers, etc.) on demand, automatically, dynamically, etc.

In operation, when a given wireless device 12 is within the range of any one of HNBs 20, 22, 24 and is attempting to initiate a session, a respective HNB 20, 22, 24 would first identify if wireless device 12 were authorized to utilize the particular HNB 20, 22, 24. For example, HNB 20 can send a register request via internet 30 to its respective HNB-GW 26. HNB-GW 26 in turn sends an access request to service provider network 50 in order to obtain whitelist data. Service provider network 50 then sends whitelist data back to HNB-GW 26, which can then determine if wireless device 12 is authorized. HNB-GW 26 is configured to send the appropriate accept/deny to HNB 20, 22, 24. The protocols by which the requests between these components are dealt with are described in detail below.

Wireless devices 12 can be associated with clients or customers wishing to initiate a communication in communication system 10 via some network. The term 'wireless device' is interchangeable with the terminology 'endpoint' and 'user equipment (UE)', where such terms are inclusive of devices used to initiate a communication, such as a computer, a personal digital assistant (PDA), a laptop or electronic notebook, a cellular telephone, an i-Phone, an i-Pad, a Google Droid, an IP phone, or any other device, component, element, or object capable of initiating voice, audio, video, media, or data exchanges within communication system 10.

Wireless device 12 may also be inclusive of a suitable interface to the human user, such as a microphone, a display, a keyboard, or other terminal equipment. Wireless devices 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, or script data, or any type of source or object code, or any other suitable information in any appropriate format that may be communicated from one point to another. Wireless device 12 can be able to communicate wirelessly using a macro service via one of the HNBs 20, 22, 24. As wireless device 12 is moved from one location to another, HNBs 20, 22, 24 can hand off to one another (or to macro cell towers), enabling the user to experience continuous communication capabilities.

Each HNB 20, 22, 24 can offer suitable connectivity to one or more wireless devices using any appropriate protocol or technique. In general terms, each HNB represents an access point device that can allow wireless devices to connect to a wired network using Wi-Fi, Bluetooth, WiMAX, UMTS, or any other appropriate standard. Hence, the broad term 'access point' is inclusive of a wireless access point (WAP), a femtocell, a hotspot, a picocell, a WiFi array, a wireless bridge (e.g., between networks sharing same Service Set Identifier (SSID) and radio channel), a wireless local area network (LAN), or any other suitable access device, which may be capable of providing suitable connectivity to a wireless device. In certain cases, the access point connects to a router (via a wired network), and it can relay data between the wireless devices and wired devices of the network.

In one example implementation, HNB-GWs 26, 28 are network elements that facilitate or otherwise help coordinate whitelist management activities (e.g., for networks such as those illustrated in FIG. 1). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, HNBs 20, 22, 24 and/or HNB-GWs 26, 28 include software to achieve the whitelist management operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Figure 2:
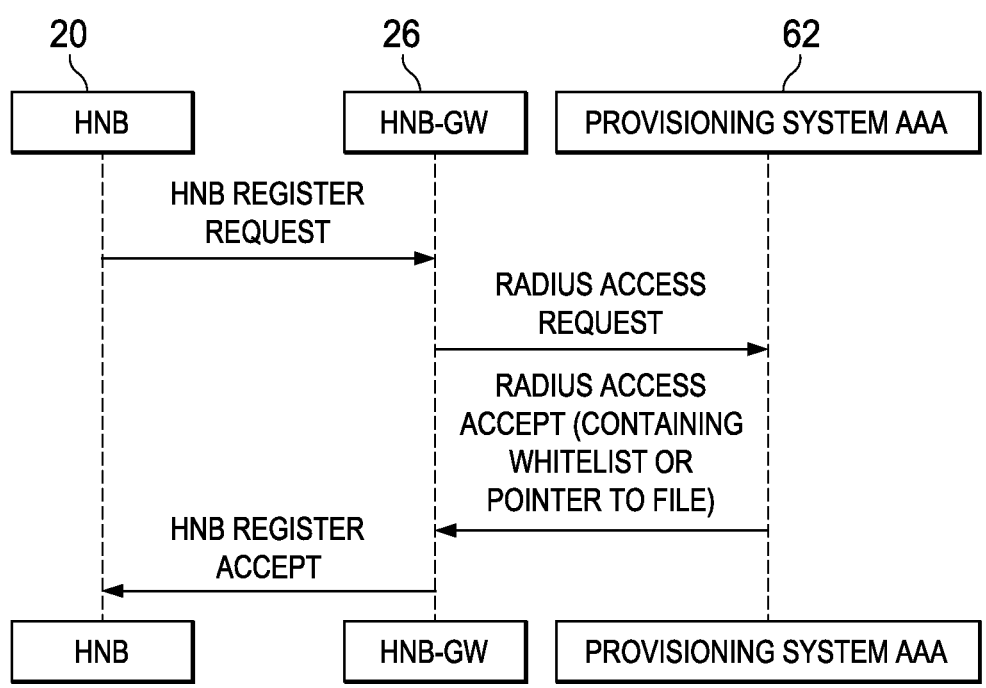
FIGS. 2-5 are simplified flow diagrams illustrating example flows within several example whitelist management architectures in accordance with various embodiments of the present disclosure.

Referring now to FIG. 2, FIG. 2 is a simplified flow diagram depicting a flow 60 associated with whitelist management. In this particular flow 60, the service provider network includes a provisioning system AAA 62, which can interact with HNB-GW 26. Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service. Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing. In addition, it may record events such as authentication and authorization failures, and include auditing functionality, which permits verifying the correctness of procedures carried out based on accounting data. In FIGS. 2-5, the flows of data represented show the flow of data between the components after a wireless device has attempted to register for service on an HNB.

Provisioning system AAA 62 is reflective of any type of IP management element. AAA servers in CDMA data networks are provisioning components that provide IP functionality to support the functions of authentication, authorization, and accounting. The AAA server in the CDMA wireless data network architecture is similar to the HLR in the CDMA wireless voice network architecture. Provisioning system AAA 62 can be capable of any type of IP address allocation, IP address correlation (to a given user, an International Mobile Subscriber Identity (IMSI), a Mobile Subscriber Integrated Services Digital Network (MSISDN) number), subscriber profile, etc.), IP address management, more generally, etc. Note that the broad term 'provisioning element' is meant to include any components capable of offering one or more of the aforementioned capabilities. In certain cases, the provisioning element can suitably maintain whitelist data, which can include the actual whitelists, associated files, whitelist data, pointers to whitelist data, or any other suitable data that would empower a gateway or an access point to make an intelligent decision about which end users would be permitted access to a given network.

As shown in FIG. 2, operations within the architecture of FIG. 2 can include HNB 20 establishing a connection with its corresponding HNB-GW 26, and then sending a register request. HNB-GW 26 receives the request and then performs authentication and authorization by sending a RADIUS Accept Request to provisioning system AAA 62. The response (e.g., RADIUS Access Accept) can contain the whitelist as IMSIs, or MSISDNs. In addition, the RADIUS Access Accept message can include a pointer to a file (or any other suitable location), which would have this whitelist data, or which could point HNB-GW 26 to this whitelist data.

This particular scenario of FIG. 2 is most applicable in a consumer or small business setting, where the whitelist would be unique for each HNB 20. If the wireless device (that requested access) is on the whitelist, then HNB-GW 26 can accept the register request from HNB 20 for this particular flow. At this juncture, HNB-GW 26 can provide whitelist control, as well as important features such as paging reduction. While RADIUS is utilized in the present disclosure, it is to be understood that DIAMETER, TACACS, TACACS+, or any other suitable protocol could readily be utilized in its place.

Figure 3:
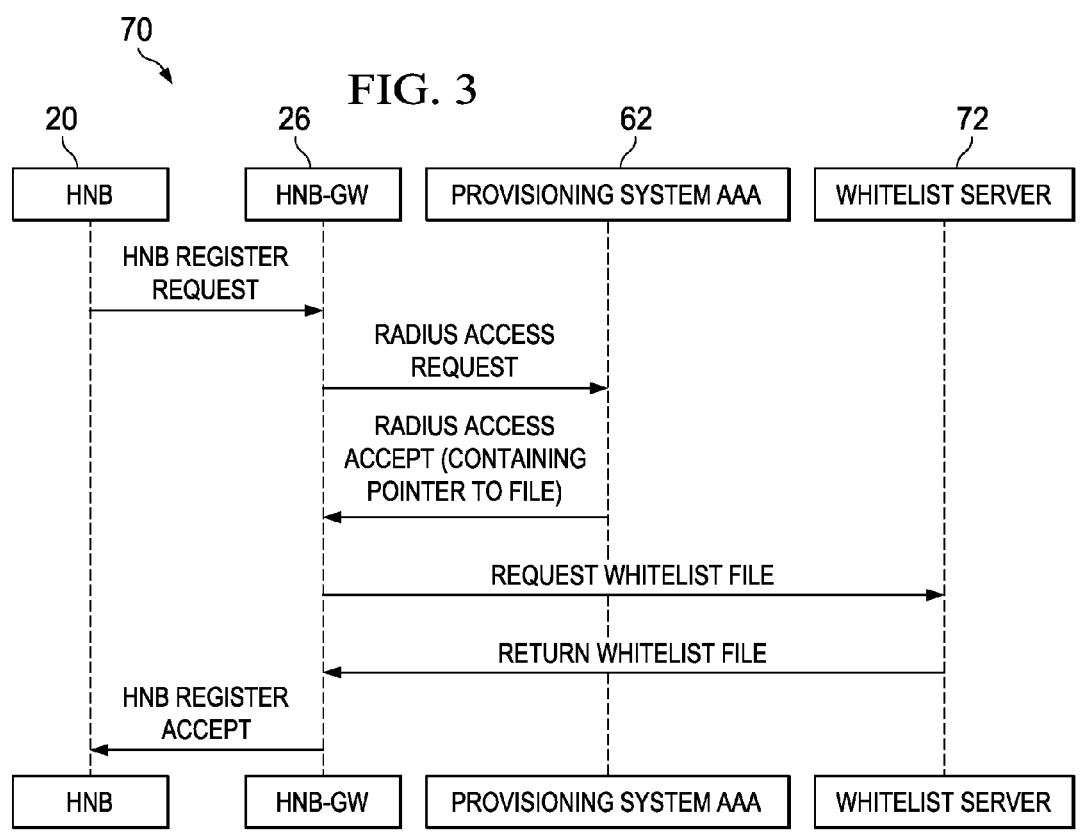

Referring now to FIG. 3, FIG. 3 illustrates a flow 70 associated with a variation of whitelist management activities. This particular flow 70 involves HNB 20, HNB-GW 26, provisioning system AAA 62, and a whitelist server 72 (which can be provisioned in any suitable location). For access points (HNBs) used in large enterprises, the same basic flow applies with the only differences being that the whitelist is typically shared amongst multiple HNBs. Additionally, a pointer (e.g., a uniform resource locator (URL)) to the whitelist can be returned to HNB-GW 26 by provisioning system AAA 62 via a RADIUS Access Accept message. After receiving the pointer to the whitelist file, HNB-GW 26 can request (and receive) the whitelist file from whitelist server 72. This may be performed over hypertext transfer protocol (HTTP), for example. The downloaded whitelist can then be processed, where the HNB registration is accepted or denied based on the retrieved whitelist data.

HNB-GW 26 can include instructions pertaining to the storage and utilization of the whitelist data. For example, HNB-GW 26 may have been instructed to only cache the whitelist for a certain amount of time. When the time interval expires, HNB-GW 26 would refresh the whitelist by requesting the whitelist from whitelist server 72 again. If no changes had occurred to the whitelist since the prior request/receipt of this information, the whitelist would not be resent to HNB-GW 26. Instead, a certain affirmation message can be sent back through the network such that HNB-GW 26 could rely on the previous instantiation of the whitelist. Further, the HNB-GW is configured to evaluate its internal cache for a file name associated with a whitelist before requesting the whitelist data. For example, a whitelist could be large, and shared among many access points. The HNB-GW can re-use a cached whitelist file in order to avoid needless transmissions/requests for whitelist data that it may already have.

Note that there could be certain nuances to how much of the whitelist is being exchanged in RADIUS messages. For example, for the particular configuration of FIG. 2 (that may be associated with a consumer or smaller business), the whitelist can be completely contained in the RADIUS message. The new whitelist would then become active. For the configuration of FIG. 3 (that may be associated with a large enterprise), HNB-GW 26 can respond to the initial message from provisioning system AAA 62 with an acknowledgement (e.g., an ACK message, a specific message acknowledgment associated with whitelist activities, etc.). Subsequently, HNB-GW 26 can then request (and receive) the whitelist data (e.g., a whitelist file) from the whitelist server. The file can be opened and the new whitelist would then become active.

Figure 4:
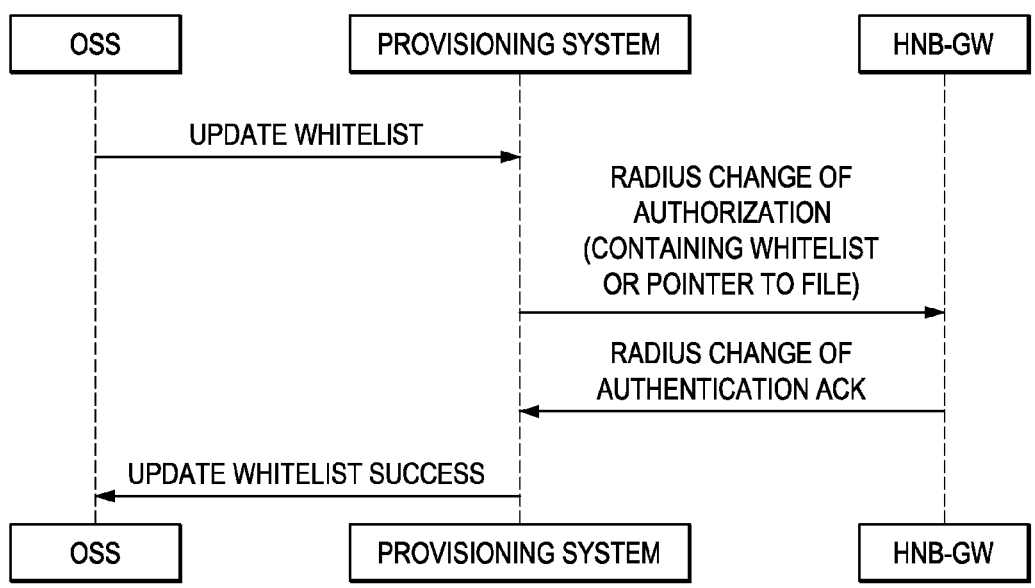

Referring now to FIG. 4, FIG. 4 is a simplified flow diagram illustrating a flow 80 associated with a suitable variation of the previously discussed whitelist activities. This particular flow 80 involves HNB-GW 26, a provisioning system, and an operational support subsystem (OSS) 82, which may be provided in the service provider network. In the configuration of FIG. 4, changes to the whitelist can occur dynamically without the HNB having to re-register. This can be accomplished by OSS 82 sending an update whitelist command to the provisioning system. In response, the provisioning system can send a RADIUS Change of Authorization message to HNB-GW 26. This RADIUS message can include the whitelist (e.g., inclusive of IMSIs, MSISDNs, etc.), a pointer (URL) to a file that contains the whitelist, all of these items, or any other suitable whitelist data.

Hence, a RADIUS-based Change-of-Authorization (CoA) interface can be associated with the HNB-GW that allows for dynamic updates to whitelists. For example, a RADIUS-based Change-of-Authorization (CoA) message allows for an update to the HNB-GW with a new whitelist when the HNB session is already in progress. A Disconnect message over this interface can instruct the HNB-GW to drop the session of a particular HNB when its service is being shut down.

Note that there are two variants for the whitelist update flows. One update is associated with an individual access point whitelist via the CoA message, as discussed above with reference to FIG. 4. Another update relates to a whitelist file that could be shared among several access points (or several gateways). There are two ways to signal a change of a cached file when its content changes. One technique is to use the CoA message that may contain the file name as a key identifier instead of the access point ID. Another technique outlines that any time the HNB-GW seeks to use a cached file, it makes a request for a last-change-date of the file to a whitelist file server. The HNB-GW then compares the last-change-date with the date of the whitelist it currently has cached. If the whitelist has not changed, then there would be no need to download the whitelist.

It should also be noted that the whitelist download can be extended to those access points that could be deployed in a hybrid mode. Hybrid in this sense is meant to refer to the scenario in which the access point is in an open mode, but gives privileged access (e.g., priority) to identified users, which could be in the whitelist. This could occur during the HNB registration. Subsequently, in case a user is determined to be a privileged user, the corresponding information status could be communicated to the HNB via an HNB register answer.

Figure 5:
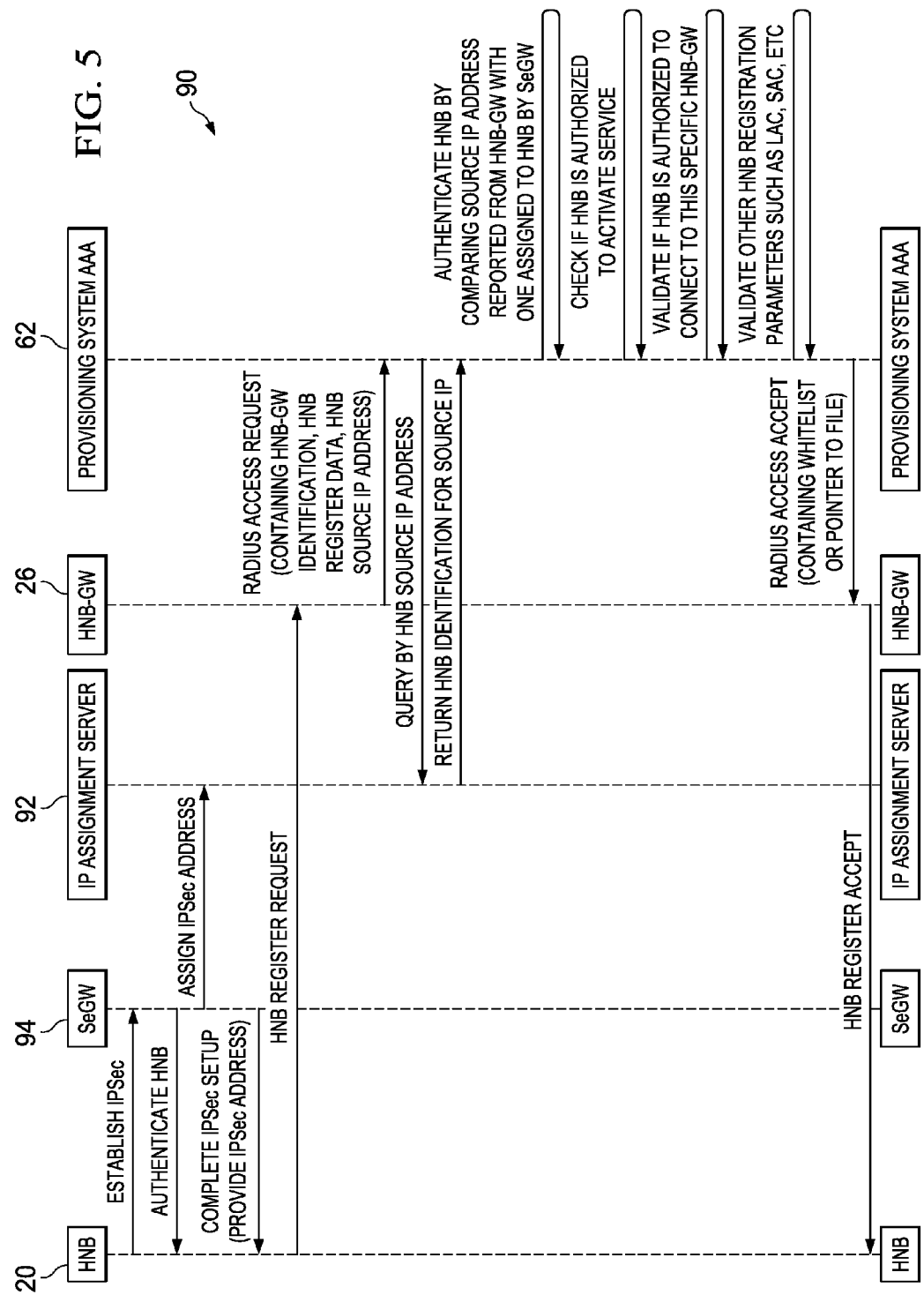

FIG. 5 is a simplified flow diagram illustrating a particular flow 90 associated with a variation of whitelist management. This particular flow 90 involves HNB 20, HNB-GW 26, provisioning system AAA 62, an IP assignment server 92, and a security gateway (SeGW) 94, which can be part of the service provider's infrastructure. In addition to providing the whitelist to HNB-GW 26, the architecture of FIG. 5 can additionally perform authentication, authorization, and source IP address verification (e.g., to prevent spoofing).

In operation, HNB 20 can perform an Internet Protocol Security (IPsec) set-up with SeGW 94. IPsec can use cryptographic security services to protect communications over Internet Protocol (IP) networks. IPsec can support network-level peer authentication, data origin authentication, data integrity, data confidentiality (encryption), and replay protection. Implementation of IPsec can be based on Internet Engineering Task Force (IETF) standards. SeGW 94 can perform authentication and obtain an assigned IPsec address from IP assignment server 92. IP assignment server 92 could be a separate dynamic host configuration protocol (DHCP) server, a local service on SeGW 94, another IP assignment entity, etc.

HNB 20 can initiate registration with HNB-GW 26 by routing a request over the IPsec tunnel. A RADIUS Access Request message sent by HNB-GW 26 to provisioning system AAA 62 can include the HNB register data, HNB-GW IDs (either IP address or FQDN), HNB's source IP address as seen by HNB-GW 26 (IPsec address), and the HNB's identifier. Provisioning system AAA 62 can perform additional authentication using this information. For example, if HNB 20 is not found in provisioning system AAA's 62 database, then it cannot be authenticated. Hence, HNB 20 would be invalid and a RADIUS Access Reject message can be sent to HNB-GW 26 instead of the Access Accept message.

Alternatively, if the source IP address can be validated, HNB 20 can be issued an IPsec address by the service provider. In one embodiment, DHCP can be used to assign IP addresses; in other instances, RADIUS could be used to assign IP addresses. Provisioning system AAA 62 can query (e.g., using the given source IP address) to the IP address assignment servers, where the related HNB identifier is returned. Provisioning system AAA 62 can then compare the HNB identifiers. If the identifiers are equal, the HNB's source IP address is valid, otherwise it is invalid, and a RADIUS Access Reject message can be sent to the HNB-GW instead of the Access Accept message.

In another alternative, provisioning system AAA 62 can confirm that HNB 20 is connecting to its assigned HNB-GW 26 by using the HNB-GW ID in the RADIUS Access Request. The actual ID in this instance can be associated with any element that suitably identifies the gateway. If the assigned HNB-GW 26 does not match the HNB-GW ID in the RADIUS Access Request, HNB 20 is not authorized to be connected to that HNB-GW 26. In such an instance, a RADIUS Access Reject message is sent to the HNB-GW 26 instead of the Access Accept message.

In another alternative, the parameters within HNB 20 register data can include items such as Service Area Code (SAC), Routing Area Code (RAC), Location Area Code (LAC), Mobile Country Code (MCC), Mobile Network Code (MNC), etc. These can be assigned by provisioning system AAA 62 and, therefore, provisioning system AAA 62 can validate that the parameters are correct. This would allow HNB 20 to be authorized to use the values in the register. If they are not correct, a RADIUS Access Reject message can be sent to HNB-GW 26 instead of the Access Accept message. Otherwise, HNB 20 is suitably authenticated, authorized on HNB-GW 26, and its source IP address would be valid. A RADIUS Access Accept message can be sent containing the whitelist, as described above in reference to FIG. 2 or FIG. 3.

Figure 6:
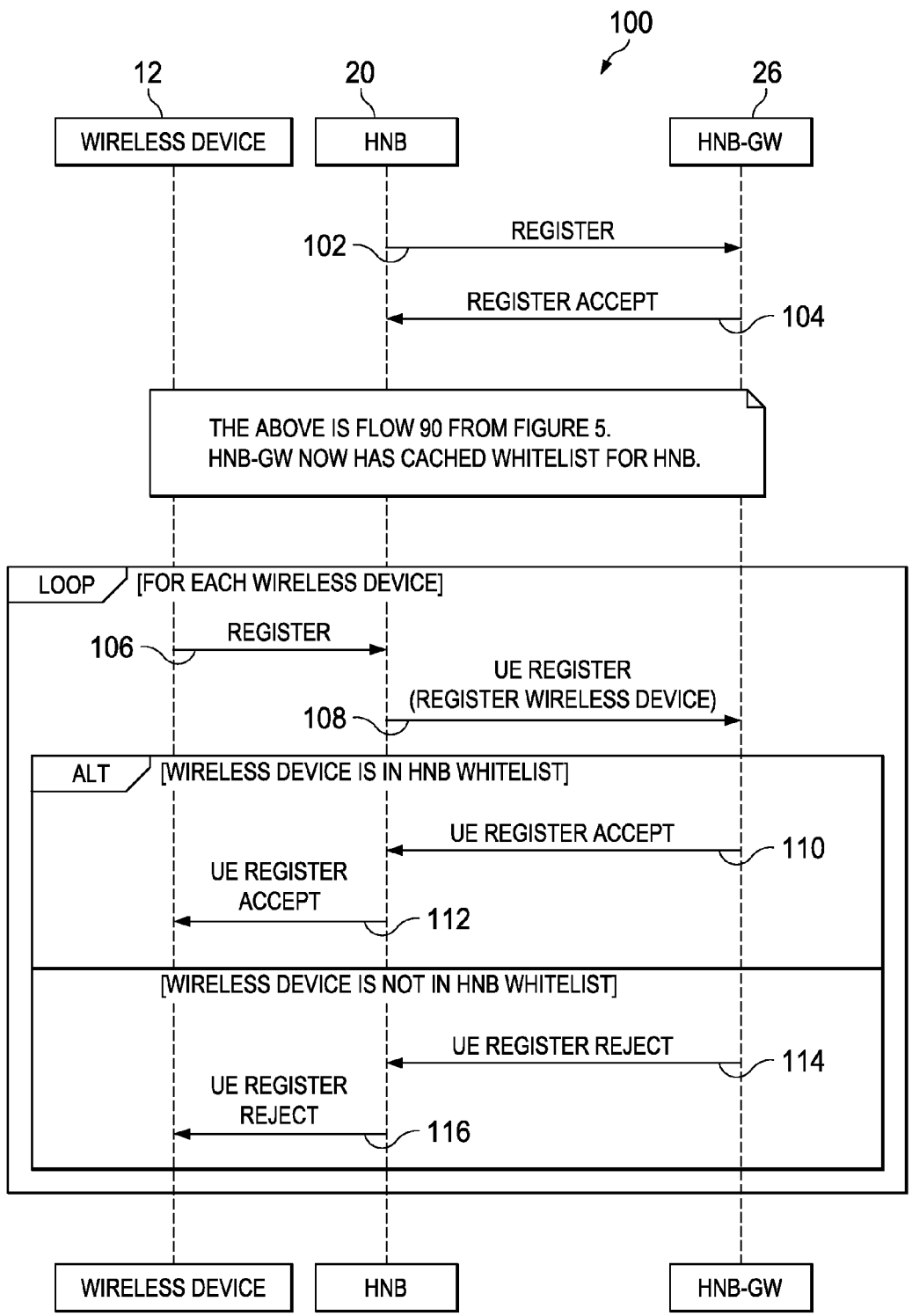
FIG. 6 is a simplified flow diagram that illustrates example activities associated with whitelist management in a radio access environment in accordance with one embodiment of the present disclosure.

FIG. 6 is a simplified flow diagram 100 that illustrates example activities associated with whitelist management in a radio access environment in accordance with one embodiment of communication system 10. A particular flow may begin at 102, where HNB 20 initially registers with its associated HNB-GW 26. At 104, a register accept message is sent to HNB 20. [The above is representative of flow 90 from FIG. 5. HNB-GW 26 now has the cached whitelist for HNB 20.] A loop is created for each wireless device 12 at 106, where registered messages are propagated to HNB 20. At 108, a UE register message is communicated to HNB-GW 26. If the particular wireless device is in the HNB whitelist, then a UE register accept message is communicated to HNB 20 at 110, and then passed on to wireless device 12 at 112. If the particular wireless device is not in the HNB whitelist, then a UE register reject message is communicated at 114, and then passed on to wireless device 12 at 116.

In regards to the internal structure associated with communication system 10, each of HNBs 20, 22, 26 and HNB-GWs 26, 28 can include memory elements for storing information to be used in achieving the whitelist management operations, as outlined herein. Additionally, each of these devices may include a processor that can execute software or an algorithm to perform the whitelist management activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to HNBs 20, 22, 26, and HNB-GWs 26, 28 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the whitelist management functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 1] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 1] could transform an element or an article (e.g., data) from one state or thing to another state or thing. In another example, the whitelist management activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the previously described activities illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 10 may be applicable to other exchanges, routing protocols, or routed protocols in which whitelists are utilized in order to provide and limit access to a network. Moreover, although communication system 10 has been illustrated with reference to particular elements and operations that facilitate the communication process, these elements and operations may be replaced by any suitable architecture or process that achieves the intended functionality of communication system 10.

In a separate endeavor, communication system 10 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 10. Moreover, the present disclosure is equally applicable to other cellular and/or wireless technology including CDMA, Wi-Fi, WiMAX, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a registration request for a session involving a wireless device at a network element comprising a Home Node B Gateway ("HNB-GW"), wherein the request is received from an access point;
    communicating a query for whitelist data associated with the access point from the HNB-GW to a remotely located provisioning element, wherein the query is communicated as a RADIUS access request message;
    receiving the whitelist data at the HNB-GW via a RADIUS access accept message;
    caching the whitelist data at the HNB-GW for a predetermined time period;
    communicating a message from the HNB-GW to the access point, wherein the message is indicative of whether the session is to be accepted or denied based on a review of the whitelist data by the HNB-GW;
    prior to the communicating a query, determining whether the whitelist data is already cached at the HNB-GW; and
    If the whitelist data is already cached at the HNB-GW, omitting the communicating a query, receiving, and storing;
    wherein the whitelist data includes an International Mobile Subscriber Identity (IMSI) or a Mobile Subscriber Integrated Services Digital Network (MSISDN) number for each of a plurality of wireless devices authorized to connect to the HNB-GW via the access point.

2. The method of claim 1, wherein source Internet protocol (IP) address verification associated with the session is executed before a wireless device associated with the access point is permitted access to a network.

3. The method of claim 1, wherein the whitelist data includes a pointer to a whitelist server, and wherein the network element is configured to request a whitelist file from the whitelist server.

4. The method of claim 1 further comprising upon expiration of the predetermined time interval:
    communicating a new query for whitelist data to the remotely located provisioning element;
    if the remotely located provisioning element determines that the whitelist data has been updated since it was last sent to the HNB-GW, receiving the updated whitelist data at the HNB-GW.

5. The method of claim 1, wherein parameters within a register data of the access point are used in order to validate a source IP address, and authenticate the access point such that it is authorized for subsequent flows with the network element.

6. One or more non-transitory media that includes code for execution and when executed by a processor operable to perform operations comprising:
    receiving a registration request for a session involving a wireless device at a network element comprising a Home Node B Gateway ("HNB-GW"), wherein the request is received from an access point;
    communicating a query for whitelist data associated with the access point from the HNB-GW to a remotely located provisioning element, wherein the query is communicated as a RADIUS access request message;
    receiving the whitelist data at the HNB-GW via a RADIUS access accept message;
    caching the whitelist data at the HNB-GW for a predetermined time period;
    communicating a message from the HNB-GW to the access point, wherein the message is indicative of whether the session is to be accepted or denied based on a review of the whitelist data by the HNB-GW;
    prior to the communicating a query, determining whether the whitelist data is already cached at the HNB-GW; and
    If the whitelist data is already cached at the HNB-GW, omitting the communicating a query, receiving, and storing;
    wherein the whitelist data includes an International Mobile Subscriber Identity (IMSI) or a Mobile Subscriber Integrated Services Digital Network (MSISDN) number for each of a plurality of wireless devices authorized to connect to the HNB-GW via the access point.

7. The media of claim 6, wherein source Internet protocol (IP) address verification associated with the session is executed before a wireless device associated with the access point is permitted access to a network.

8. The media of claim 6, wherein the whitelist data includes a pointer to a whitelist server, and wherein the network element is configured to request a whitelist file from the whitelist server.

9. The media of claim 6 further comprising upon expiration of the predetermined time interval:
    communicating a new query for whitelist data to the remotely located provisioning element;
    if the remotely located provisioning element determines that the whitelist data has been updated since it was last sent to the HNB-GW, receiving the updated whitelist data at the HNB-GW.

10. The media of claim 6, wherein parameters within a register data of the access point are used in order to validate a source IP address, and authenticate the access point such that it is authorized for subsequent flows with the network element.

11. A network element, comprising:
    a memory element configured to store electronic code;
    a processor operable to execute instructions associated with the electronic code; and
    an access management module coupled to the memory element and the processor, wherein the network element comprises a Home Node B Gateway ("HNB-GW) and is configured for:
    receiving a registration request for a session involving a wireless device at a network element comprising a Home Node B Gateway ("HNB-GW"), wherein the request is received from an access point;
    communicating a query for whitelist data associated with the access point from the HNB-GW to a remotely located provisioning element, wherein the query is communicated as a RADIUS access request message;
    receiving the whitelist data at the HNB-GW via a RADIUS access accept message;

caching the whitelist data at the HNB-GW for a predetermined time period;

communicating a message from the HNB-GW to the access point, wherein the message is indicative of whether the session is to be accepted or denied based on a review of the whitelist data by the HNB-GW;

prior to the communicating a query, determining whether the whitelist data is already cached at the HNB-GW; and if the whitelist data is already cached at the HNB-GW, omitting the communicating a query, receiving, and storing;

wherein the whitelist data includes an International Mobile Subscriber Identity (IMSI) or a Mobile Subscriber Integrated Services Digital Network (MSISDN) number for each of a plurality of wireless devices authorized to connect to the HNB-GW via the access point.

12. The network element of claim 11, wherein source Internet protocol (IP) address verification associated with the session is executed before a wireless device associated with the access point is permitted access to a network.

13. The network element of claim 11, wherein the whitelist data includes a pointer to a whitelist server, and wherein the network element is configured to request a whitelist file from the whitelist server.

14. The network element of claim 11 further comprising upon expiration of the predetermined time interval:

communicating a new query for whitelist data to the remotely located provisioning element;

if the remotely located provisioning element determines that the whitelist data has been updated since it was last sent to the HNB-GW, receiving the updated whitelist data at the HNB-GW.

15. The network element of claim 11, wherein parameters within a register data of the access point are used in order to validate a source IP address, and authenticate the access point such that it is authorized for subsequent flows with the network element.

16. The network element of claim 11, wherein a whitelist is downloaded from a server.

17. The network element of claim 11, wherein the network element evaluates its internal cache for a file name associated with a whitelist before requesting the whitelist.

18. The network element of claim 11, wherein the network element receives a RADIUS Change of Authorization ("CoA") message that reflects changes to a whitelist.

19. The network element of claim 18, wherein a file name is used as a key identifier in the CoA message.

20. The network element of claim 11, wherein the network element is further configured for:

requesting a last-change-date of a whitelist file;

comparing the last-change-date with a date of a whitelist that is currently being cached; and determining whether to download the whitelist file based on the comparing.

* * * * *